United States Patent
Fromson et al.

(12)

(10) Patent No.: US 6,281,159 B1
(45) Date of Patent: Aug. 28, 2001

(54) METHOD OF FORMING CATALYST STRUCTURE WITH CATALYST PARTICLES FORGED INTO SUBSTRATE SURFACE

(75) Inventors: Howard A. Fromson, 43 Main St., Stonington, CT (US) 06378; William J. Rozell, Vernon, CT (US)

(73) Assignee: Howard A. Fromson, Stonington, CT (US)

( * ) Notice: Subject to any disclaimer, the term of this patent is extended or adjusted under 35 U.S.C. 154(b) by 0 days.

(21) Appl. No.: 09/590,736

(22) Filed: Jun. 8, 2000

(51) Int. Cl.⁷ .............................. B01J 21/34; B01J 33/00
(52) U.S. Cl. .......................... 502/324; 502/439; 427/368
(58) Field of Search ..................... 502/439, 324, 502/345, 337, 338, 350, 319, 343; 427/359, 368, 369

(56) References Cited

U.S. PATENT DOCUMENTS

| 3,652,317 | * | 3/1972 | Della Porta et al. . |
| 3,746,658 | * | 7/1973 | Porta et al. . |
| 3,891,516 | * | 6/1975 | Chu . |
| 4,765,874 | * | 8/1988 | Modes et al. . |
| 5,262,129 | * | 11/1993 | Terada et al. . |
| 5,363,278 | * | 11/1994 | Komorita et al. . |
| 5,492,769 | * | 2/1996 | Pryor et al. . |
| 5,693,207 | * | 12/1997 | Fromson et al. . |
| 5,916,840 | * | 6/1999 | Ebner et al. . |
| 6,083,871 | * | 7/2000 | Fromson et al. . |
| 6,145,565 | * | 11/2000 | Fromson et al. . |

FOREIGN PATENT DOCUMENTS

2340775 * 1/2000 (GB) .

* cited by examiner

*Primary Examiner*—Steven P. Griffin
*Assistant Examiner*—Christina Ildebrando
(74) *Attorney, Agent, or Firm*—Alix, Yale & Ristas, LLP

(57) ABSTRACT

A catalyst structure is formed by forging catalytic particles from a slurry into the surface of a metal substrate such that the particles protrude from the surface and are permanently fixed into the surface. The forging is accomplished by engaging rollers with the surface as it passes through the slurry to press the particles into the surface. The rollers may be brush rollers, fabric rollers or solid rollers. The particles may be any particles which have catalytic activity for a particular purpose and which are hard enough to forge into the metal substrate.

7 Claims, No Drawings

METHOD OF FORMING CATALYST STRUCTURE WITH CATALYST PARTICLES FORGED INTO SUBSTRATE SURFACE

BACKGROUND OF THE INVENTION

The present invention relates to a method of forming a catalyst structure comprising a substrate having protruding catalyst particles permanently fixed into the surface of the substrate.

Catalyst structures have been disclosed in the prior art which involve the placement of catalyst materials onto the surface of a substrate. At least one of the uses for these prior art catalytic structures is for the conversion of atmospheric ozone to molecular oxygen as well as the conversion of other airborne pollutants such as carbon monoxide and unburned hydrocarbons into harmless compounds such as carbon dioxide and water vapor. One particular use has been for the construction of automotive heat exchangers such as radiators and air conditioning condensers.

U.S. Pat. No. 4,206,083 discloses the co-precipitation of platinum, palladium and manganese oxide on a ceramic support forming a catalyst for the decomposition of ozone in air. The ceramic support is impregnated with a solution containing the precursors of the desired catalyst. The impregnated support is then dried and heated to produce platinum and palladium metal and manganese oxide.

In U.S. Pat. No. 4,343,776, an ozone abatement catalyst is described having a carrier or support of a porous refractory skeletal structure or metal monoliths of aluminum or other materials preferably having a plurality of flow-through channels. A platinum group metal and a non-precious Group VIII metal oxide or aluminate, such as an oxide or aluminate of iron, cobalt and nickel, are applied to the external surface of the carrier or support with the metal oxide or aluminate being applied with an alumina slip preferably prior to the application of the platinum group metal.

U.S. Pat. No. 5,187,137 likewise discloses an ozone decomposing catalyst comprising a manganese oxide together with palladium or palladium oxide formed as a thin film on a support. The support may be formed from various metal oxides or it may be a metal support. The catalyst is applied to the support as a thin film preferably with an alumina sol as a binder.

Another catalyst composition which is described as being adapted for ozone abatement is disclosed in U.S. Pat. No. 5,422,331. This catalytic material comprises a substrate, which may be aluminum, with an undercoat layer containing a mixture of fine particulate refractory metal oxide and a sol such as a silica sol providing good adherence to the substrate. An overlayer also contains a refractory metal oxide on which is dispersed a catalytic metal component, such as palladium and manganese components, which is then calcined.

U.S. Pat. No. 5,997,831 specifically discloses a method of treating the atmosphere to convert pollutants such as ozone, hydrocarbons and carbon monoxide to harmless compounds involving contacting the atmosphere with a heat exchanger which has an outer surface coated in selected areas with a catalytic layer. The catalyst may be manganese oxide and/or precious metals applied by dipping or spraying and the catalytic layer is coated with a porous protective coating such as a polymer.

SUMMARY OF THE INVENTION

The present invention relates to a method of forming a catalytic structure particularly suited to the treatment of the atmosphere to remove atmospheric pollutants. The invention relates specifically to the formation of catalysts for the decomposition of ozone to form molecular oxygen but is also applicable to catalyst materials for a range of other reactions including, for example, the decomposition of hydrocarbons and the oxidation of carbon monoxide. An object of the invention is to provide an improved method of forming a metal substrate having a surface with catalyst particles dispersed over and fixed to the surface.

The invention involves forming a catalytic structure having catalytic particles dispersed over and forged into the surface of a substrate member whereby the particles are protruding from and permanently fixed to the substrate. The substrate is a metal sheet or body, preferably aluminum or copper, which is passed through a slurry of catalyst particles which are capable of being forged into the surface of the substrate. As the substrate is passing through the slurry, the catalyst particles are pressed against the surface of the substrate to fixedly forge the particles into the surface. The substrate is preferably in web form and is passed continuously through the slurry. Pressing the particles against the surface is preferably accomplished with a rotating brush, a fabric or so-called molleton roller or solid rollers such as a solid metal roller or hard rubber roller. The catalyst particles may comprise any particulate material which is catalytic for the intended purpose and which is capable of being forged into the substrate surface.

DESCRIPTION OF THE PREFERRED EMBODIMENTS

The invention begins with a substrate member which is formed of a metal capable of having catalyst particles forged into the surface. In the preferred form, the substrate is a web of the substrate material which is continuously treated in accordance with the invention to be described and which may then be cut into desired catalytic structural shapes. However, the substrate may also be individual sheets or shaped members. The preferred substrate material is aluminum or copper but other metallic substrates can be used.

The particles for use in the present invention comprise any particulate material which is catalytic for the intended use, such as for ozone decomposition, and which is capable of being forged into the surface of the substrate. That is, the particulate catalytic material must be hard enough to be pressed and forged into the substrate surface. The preferred particles are manganese oxide particles because they are hard enough to forge and they are a particularly effective catalyst for ozone decomposition. The manganese oxide may be manganese dioxide, manganic oxide or manganous oxide. However, the invention is not limited to manganese oxide as the catalytic particles. Other examples of the particulate material are other metal oxides and in particular the transition metal oxides in so far as each one is catalytic for the particular reaction and hard enough to forge into the substrate. Specific examples are copper oxide, nickel oxide, iron oxide, titanium oxide, chromium oxide and zinc oxide.

In the present invention, the catalyst particles are forged into the surface of the substrate from a slurry. By this forging action, the particles actually penetrate into the surface whereby they are firmly captured by the forged substrate material but still substantially exposed at the surface. Although an aqueous slurry is preferred, the slurry could be formed from any desired liquid.

The forging of the particles into the substrate in the present invention takes place in the slurry with the substrate being passed through the slurry and the particles in the slurry being pressed against the substrate with a force sufficient to forge the particles partially into the substrate such that the particles protrude from the surface and such that the particles are permanently fixed into the substrate. The preferred method is to continuously pass an elongated web of the substrate material through the slurry although the invention is equally applicable to the treatment of individual sheets of substrate or to specific objects formed of the substrate material such as fan or propeller blades. As the substrate material passes through the slurry, the substrate is engaged by one or usually a series of rotating pressure cylinders or rolls which force the particles into the substrate. However, an excessive number of rolls or an excessive number of passes through the rolls will result in the particles being fully forged into the substrate whereby they no longer protrude from the surface resulting in a reduction in the catalytic efficiency. The pressure cylinders or rolls are preferably brush rolls, of the same type as used for the brush graining of plates, or molleton rolls which are fabric rolls such as used for polishing. However, solid rolls can also be used such as metal rolls or hard rubber rolls.

Several factors impact on the selection of the specific operating conditions for the forging process. The hardness and cutting nature of the catalytic particles being forged and the hardness of the metal or alloy being used as the substrate are significant factors. Each catalytic reaction will have an optimum size and distribution condition for the catalyst that will yield an optimum catalytic efficiency. Thus the selection of variables such as the particle size, concentration of particles in the slurry, roller pressure and the rotation rate of the roller will vary with each specific application.

The present invention produces a catalyst structure having a metal substrate with catalyst particles dispersed over at least one of the surfaces of the substrate and with these catalyst particles being forged into the surface whereby they are fixed in place. This permits the structure to be handled, cut, shaped and fabricated into products such as heat exchanger parts without destroying the catalytic surface such as by spalling of a coating. The particles on the surface also increase the surface area and create turbulence which results in the beneficial mixing of the air or other fluid flowing over the surface to increase the contact between the reactants and the catalyst.

What is claimed is:

1. A method of forming a catalytic structure comprising oxide catalyst particles dispersed over and forged into a surface of a substrate comprising the steps of:

(a) providing a substrate web;
   (b) forming a slurry of oxide catalyst particles of a composition capable of being forged into a surface of said substrate web;
   (c) applying said slurry to said surface of said substrate web; and
   (d) rotating a graining brush in engagement with said surface of said substrate web having said slurry thereon with a force sufficient to forge said oxide catalyst particles partially into said surface and permanently fix said oxide catalyst particles to said substrate web and leave said oxide catalyst particles protruding from said substrate web.

2. A method as recited in claim 1 wherein said oxide catalyst particles comprise an ozone decomposing catalyst.

3. A method as recited in claim 2 wherein said oxide catalyst particles comprise a manganese oxide.

4. A method as recited in claim 3 wherein said manganese oxide comprises manganese dioxide.

5. A method as recited in claim 1 wherein said substrate web comprises aluminum.

6. A method as recited in claim 1 wherein said substrate web comprises copper.

7. A method as recited in claim 1 wherein said step of rotating a graining brush in engagement with said substrate web includes rotating graining brushes in engagement with both surfaces whereby said oxide catalyst particles are forged partially into both surfaces of said substrate web.

* * * * *